(Model.)
L. S. CLARK.
TWO WHEELED VEHICLE.
No. 286,905. Patented Oct. 16, 1883.
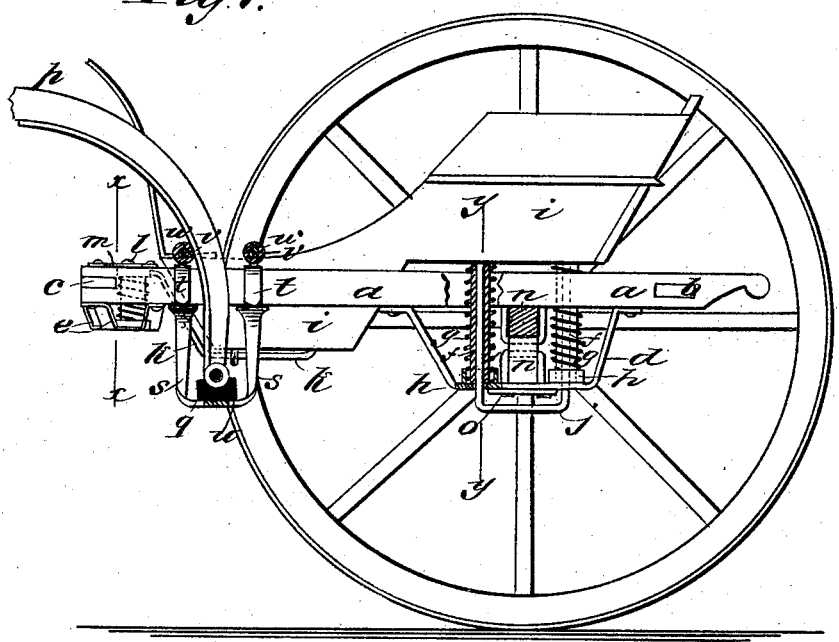
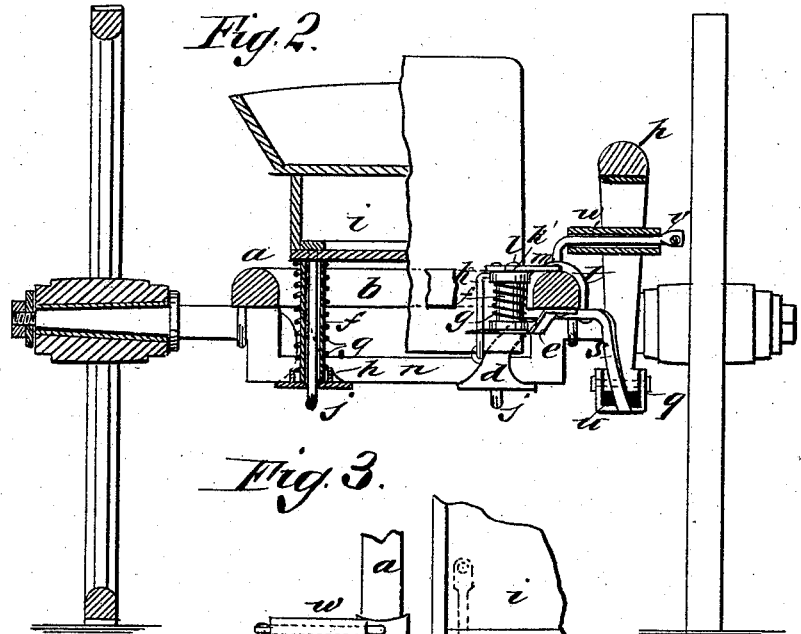
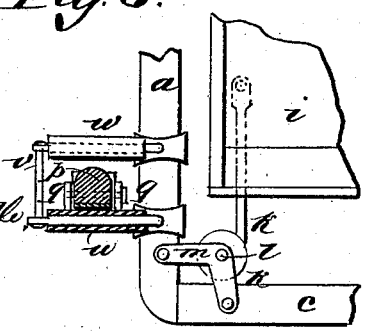
WITNESSES:
Francis McArdle
C. Sedgwick
INVENTOR:
L. S. Clark
BY Munn & Co.
ATTORNEYS.

UNITED STATES PATENT OFFICE.

LEVI S. CLARK, OF DOYLESTOWN, OHIO, ASSIGNOR TO HIMSELF, ORRIN G. FRANKS, AND GEORGE T. BAUGHMAN, OF SAME PLACE.

TWO-WHEELED VEHICLE.

SPECIFICATION forming part of Letters Patent No. 286,905, dated October 16, 1883.

Application filed June 9, 1883. (Model.)

*To all whom it may concern:*

Be it known that I, LEVI STARR CLARK, of Doylestown, in the county of Wayne and State of Ohio, have invented certain new and useful Improvements in Spring-Vehicles, of which the following is a full, clear, and exact description.

My invention consists of an improved contrivance for applying combined coiled wire and rubber springs to two or four wheeled spring-carriages, and an improved joint connection of the shaft of a two-wheeled vehicle to relieve the body from the motions of the horse, as hereinafter fully described.

Reference is to be had to the accompanying drawings, forming part of this specification, in which similar letters of reference indicate corresponding parts in all the figures.

Figure 1 is partly a longitudinal section of the frame and axle of a two-wheeled vehicle, and partly a side elevation, showing the arrangement of my improved springs and shaft-connecting joint. Fig. 2 is a transverse section of Fig. 1 on lines $x\,x$ and $y\,y$. Fig. 3 is a detail partly in plan view and partly in section.

At the corners of the frame, consisting of the side bars, $a$, and the cross-bars $b\,c$, whether of a two or four wheeled vehicle, I propose to arrange the hangers $d$ and $e$, for the support of combined rubber tube $f$ and coiled-wire springs $g$ by cups $h$, for the support of the body $i$, which may rest directly on the springs when they are placed under the body, as at the hind end, with a U-rod, $j$, extending from below the hanger up through the springs, and attached to the body for supporting-rods to the springs; or when the springs are not under the body, it may rest on them by the bent arms $k$, having a cup-eye, $k'$, in the end, through which the stay-rod $l$ passes, and which rests on the spring and plays up and down on the rod, which is secured at the ends in the hanger $e$ and the top bracket, $m$. When the hind springs are sufficiently near the axle $n$ and the axle is cranked, the hangers $d$ may cross under the axle and be secured to it by a clip, $o$, for more substantial support, especially if the hangers be inclined from the positions of the springs to the side bars for being connected to them, as shown in Fig. 2, two springs being used to each side, and said springs being placed on the opposite sides of the axle.

For connecting the shafts $p$ of a two-wheeled vehicle to the frame by a joint having sufficient rigidity to hold the body up in position, and to enable sufficient vibration to relieve the body from shake by the horse, I suspend the shackles $q$ from the frame-bars $a$ by the hangers $s$, connected to said bars by the clips $t$, in which shackles the ends of the shafts are cushioned by rubber springs $u$, to prevent rattling, and from the top of the clips $t$, I provide a yoke, $v$, of iron, to extend around the shafts, with a rubber spring, $w$, at the front and back of the shafts, between which springs there is sufficient room for the play of the shafts by the motion of the horse without vibrating the body.

In some cases I will use only the double springs at the axle and in the hind part of the frame for connecting the body, the front end being connected with the frame by any other approved form of spring or other connecting device.

Having thus described my invention, what I claim as new, and desire to secure by Letters Patent, is—

1. The combination of the yoke $v$ and springs $w$ with the shafts $p$, connected to shackles $q$, suspended below the frame $a$, said springs being arranged above the shackles and allowing the shafts to play between them by the motion of the horse, substantially as described.

2. The combination, with the body and its supporting-frame, of the combined rubber and metallic springs, stay-rods, hangers $e$, right-angled brackets $m$, and approximately L-shaped bars $k$, having the clip-eyes $k'$, substantially as shown and described, and for the purposes set forth.

LEVI STARR CLARK.

Witnesses:
    ALONZO DULEY,
    A. HILBERT.